United States Patent [19]

Keys et al.

[11] Patent Number: 5,054,242
[45] Date of Patent: Oct. 8, 1991

[54] FOUR-SIDED FLUSH GLASS ASSEMBLY

[75] Inventors: James F. Keys, West Bloomfield; Robert A. Vaughan, Dearborn; John W. Belser, Northville, all of Mich.

[73] Assignee: The Standard Products Company, Cleveland, Ohio

[21] Appl. No.: 537,034

[22] Filed: Jun. 12, 1990

Related U.S. Application Data

[63] Continuation of Ser. No. 272,566, Nov. 16, 1988, Pat. No. 4,932,161.

[51] Int. Cl.$^5$ .............................................. E06B 7/16
[52] U.S. Cl. ...................................... 49/491; 49/374; 49/377; 49/441; 49/495
[58] Field of Search ................ 49/491, 490, 485, 489, 49/494, 495, 440, 441, 374, 375, 376, 377, 502, 479

[56] References Cited

U.S. PATENT DOCUMENTS

| | | | |
|---|---|---|---|
| 3,868,788 | 3/1975 | Podolan | 49/374 |
| 4,417,419 | 11/1983 | Rossie et al. | 49/485 X |
| 4,454,688 | 6/1984 | Rest et al. | 49/440 X |
| 4,604,830 | 8/1986 | Maeda et al. | 49/374 |
| 4,625,459 | 12/1986 | Warner | 49/489 X |
| 4,653,801 | 3/1987 | Shirasu et al. | 49/490 X |
| 4,656,784 | 4/1987 | Brachmann | 49/441 X |
| 4,662,113 | 5/1987 | Weaver | 49/441 X |
| 4,667,442 | 5/1987 | Hiramatsu et al. | 49/441 |
| 4,744,173 | 5/1988 | Mesnel et al. | 49/377 X |
| 4,783,930 | 11/1988 | Tiesler | 49/374 |
| 4,932,161 | 6/1990 | Keys et al. | 49/491 |

Primary Examiner—Philip C. Kannan
Attorney, Agent, or Firm—Harness, Dickey & Pierce

[57] ABSTRACT

A gasket system has a gasket adapted to be secured about an opening. The gasket includes a mechanism for retaining and sealing a window or the like. The gasket is positioned about the opening such that when the window is positioned within the opening, the window substantially conceals the gasket and is flush at its perimeter with the opening.

20 Claims, 4 Drawing Sheets

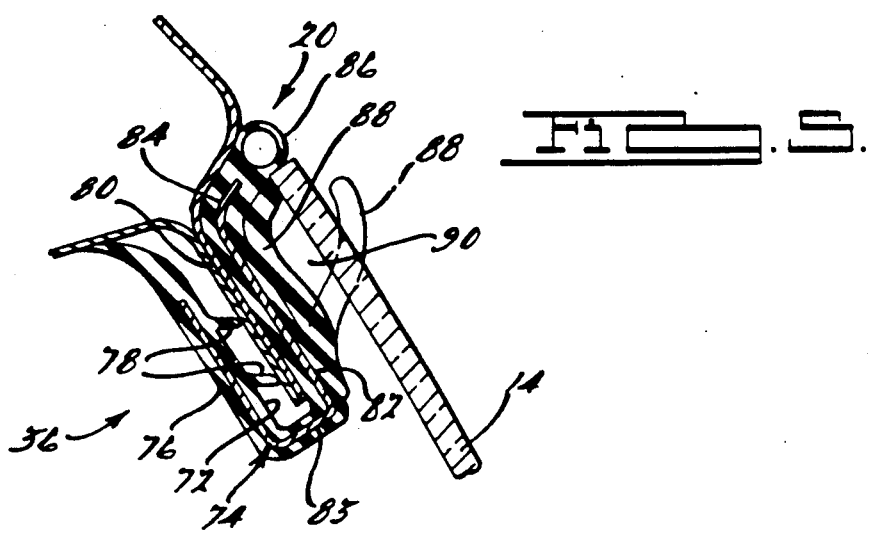
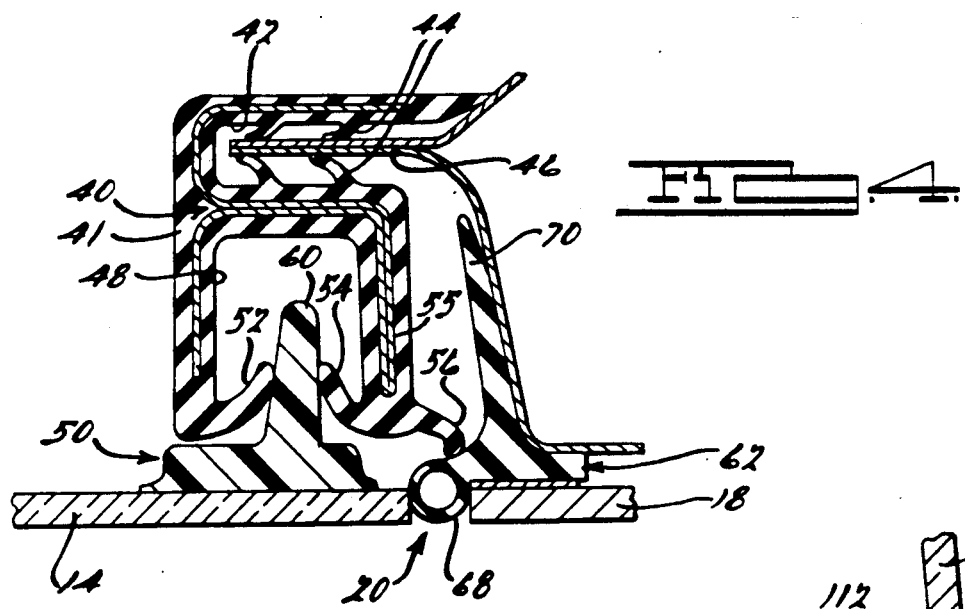
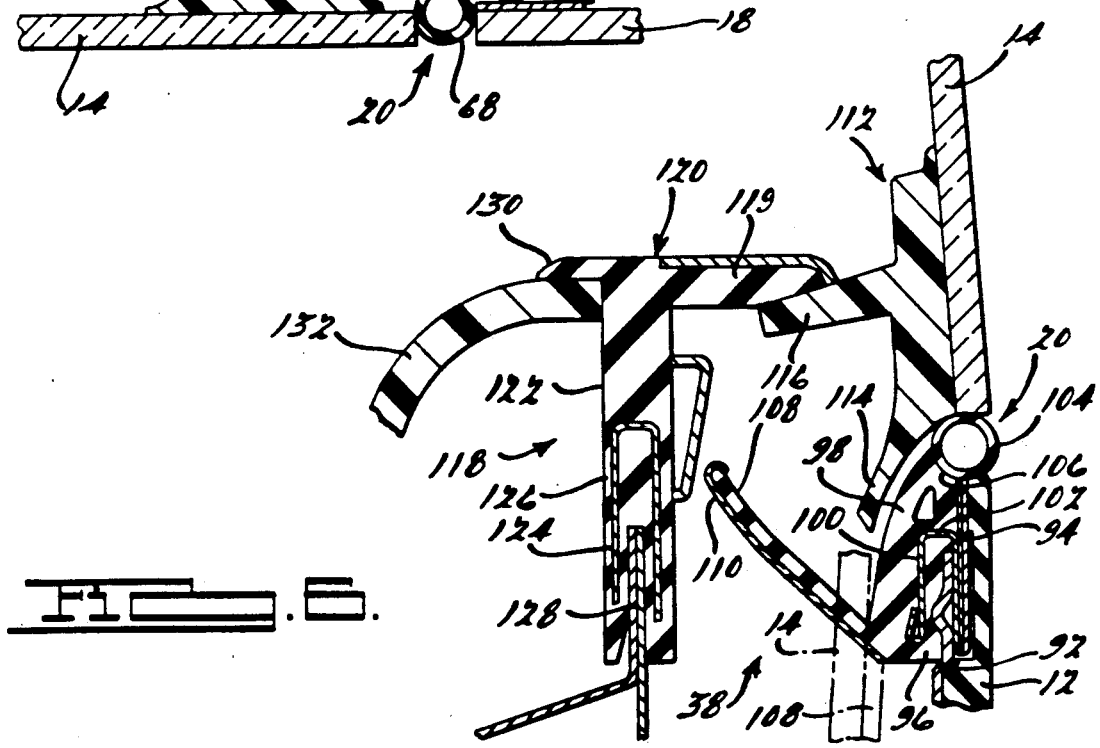

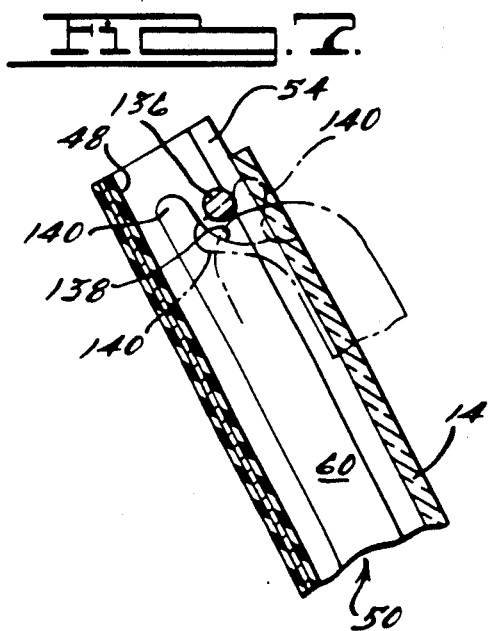
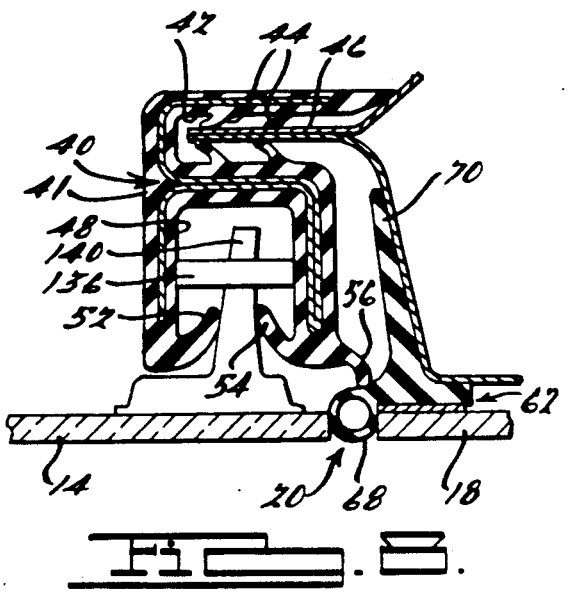
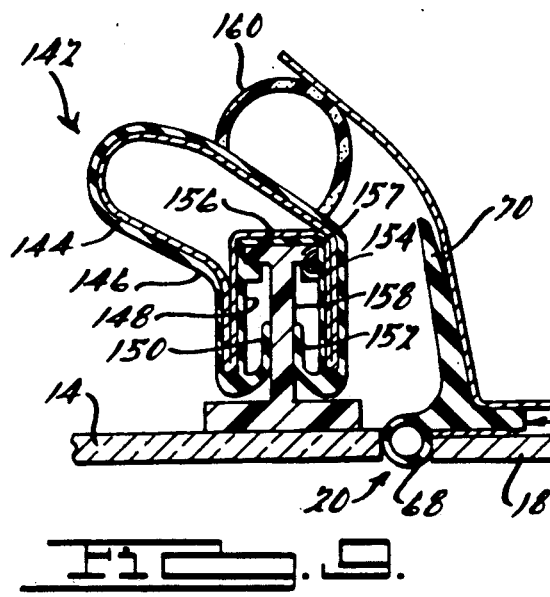
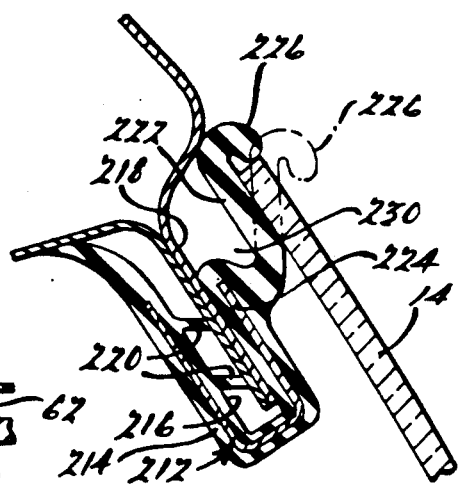
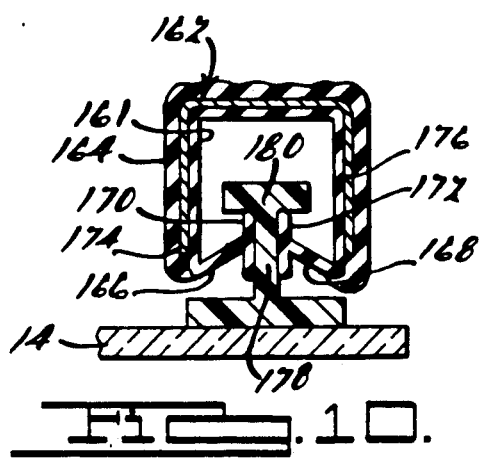
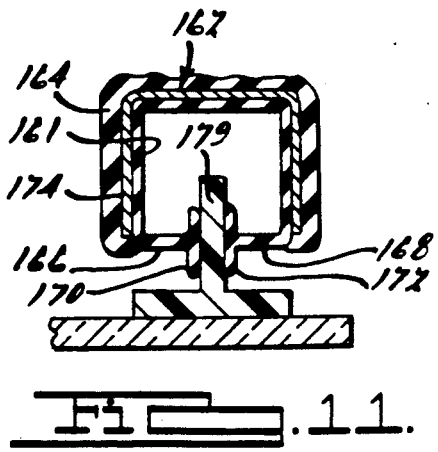

FOUR-SIDED FLUSH GLASS ASSEMBLY

This is a continuation of U.S. Pat. application Ser. No. 272,566, filed Nov. 16, 1988, now Pat. No. 4,932,161.

BACKGROUND OF THE INVENTION

The present invention relates to weather stripping gasket assemblies and, more particularly, to a weather stripping gasket assembly that, when positioned on a vehicle, provides the vehicle windows with a peripheral flush appearance with the vehicle body.

In the automotive industry, it is desirous to have moveable windows which are flush with the vehicle body roof, door and side pillars. This flushness, while providing an aesthetic appearance also provides aerodynamic characteristics and reduces drag. When providing moveable windows that are peripherally flush with the vehicle body, the sealing of the windows must be taken into consideration. In a peripheral or four-sided flush moveable window system, the weather stripping is substantially behind or on the interior of the window concealed from view from the outside of the vehicle.

Weather stripping currently utilized by the automotive industry for moveable windows has a U-shaped glass run channel. The U-shaped channel sandwiches the window periphery between the legs and web of the U-shaped channel to retain and seal the window. These types of glass run channel systems also have a portion of the weather stripping or a molding on the exterior or outside of the window.

Accordingly, the present invention provides the art with a weather stripping system for moveable vehicle windows which enable the windows to be peripherally flush with the vehicle body. The present invention provides the art with a weather stripping system that is substantially concealed from view by the moveable windows in a closed position.

Further understanding of the present invention will be had from the following description of the preferred embodiments taken in conjunction with the attached drawings and the appended claims.

BRIEF DESCRIPTION OF THE DRAWINGS

FIG. 4 is an enlarged view of FIG. 3 within circle 4.

FIG. 5 is an enlarged view of FIG. 2 within circle 5.

FIG. 6 is an enlarged view of FIG. 2 within circle 6.

FIG. 7 is a vertical cross-section view through the plane defined by line 7—7 of FIG. 1.

FIG. 8 is a horizontal cross-sectional view through the plane defined by line 8—8 of FIG. 1.

FIG. 9 is a horizontal cross-section view of another embodiment of present invention like that of FIG. 4.

FIG. 10 is a horizontal cross-section view of another embodiment of the present invention like that of FIG. 4.

FIG. 11 is a horizontal cross-section view of another embodiment of the present invention like that of FIG. 4.

FIG. 15 is a vertical cross-section view of another embodiment of the present invention like that of FIG. 5.

DETAILED DESCRIPTION OF THE PREFERRED EMBODIMENTS

Figure 1:
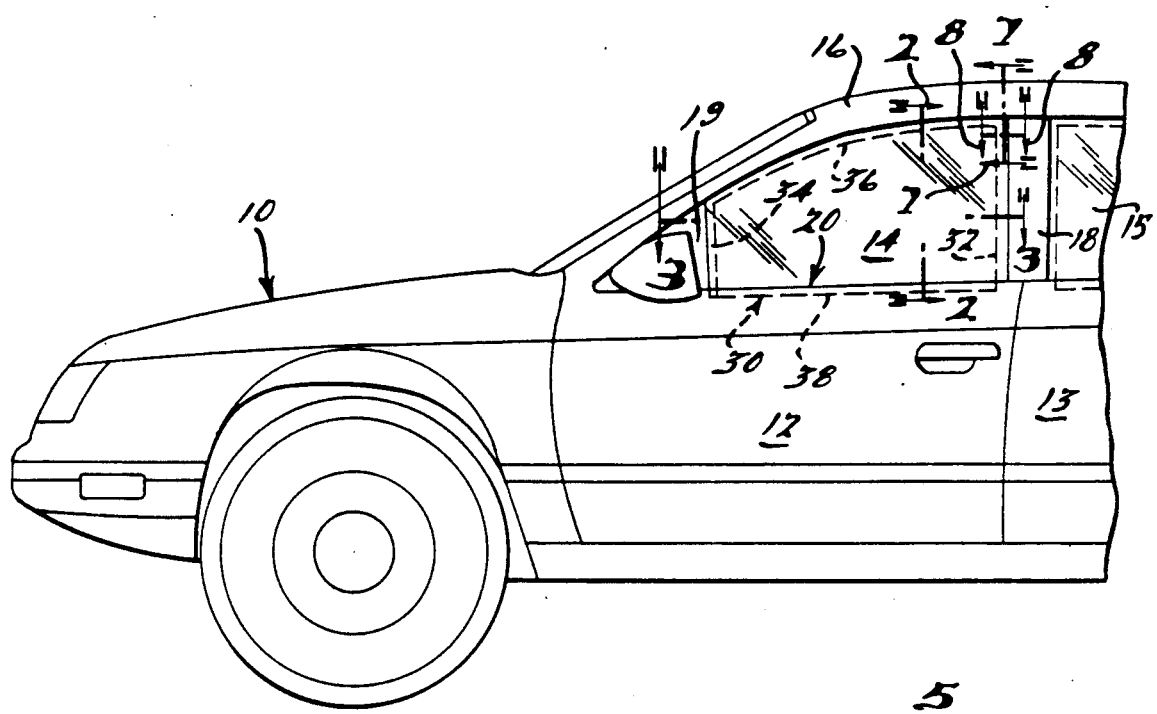
FIG. 1 is a side elevation view of a vehicle embodying a weather stripping gasket system in accordance with the present invention.
Figure 2:
FIG. 2 is a vertical cross-section view through a plane defined by line 2—2 of FIG. 1.

Turning to the figures, particularly FIG. 1, a vehicle 10 is illustrated with the weather stripping gasket assembly of the present invention. The vehicle 10 includes doors 12 and 13, windows 14 and 15, and roof 16. As can be seen from FIGS. 1-3, the windows 14 and 15 are substantially flush with the vehicle doors 12, 13, roof 16 and side and mirror panels 18 and 19. A small elastomeric bead 20, secured to the weather stripping gasket assembly, defines an outline of the periphery of the windows 14 and 15, provides an elastomeric seal and spaces the windows 14 and 15 from the sheet metal of the doors 12 and 13, roof 16 and the side and mirror panels 18 and 19.

The weather stripping gasket assembly 30 is adapted to be secured about an opening in the vehicle 10. The weather stripping gasket assembly 30 is generally comprised of four separate and distinct portions forming the gasket system 30. The portions are side pillar members 32 and 34, top header member 36 and bottom member 38. The side members 32 and 34, top member 36 and bottom member 38 may be integrally formed as a single unit or may be positioned individually onto the vehicle 10.

The side members 32 and 34 are substantially identical and the following discussion will relate to both. Turning to FIG. 4, a cross-section view of the side pillar members 32 and 34 is illustrated. The side pillar member weather strip 32, 34 includes a metallic reinforcement member 40 surrounded by an integral elastomeric skin 41. In cross-section, the reinforcement member 40 includes a first U-shaped channel 42 having elastomeric fingers 44 extending from skin 41 into the interior of the channel 42. The fingers 44 secure the weather stripping 32, 34 onto a flange 46 about the opening on the vehicle 10.

A second U-shaped channel 48 of the reinforcement member 40, positioned transverse to the first U-shaped channel 42, is adapted to receive a member 50 secured to the window 14. The second U-shaped channel 48 generally has a pair of fingers 52 and 54 projecting from the skin 41 into the channel 48 to sealably contact member 50, as seen in FIG. 4. A sealing flange 56 extends from the skin 41 at the end of one of the legs 55 of the U-shaped channel 48 to enhance the seal of the weather stripping 32, 34 with the vehicle opening.

Figure 3:
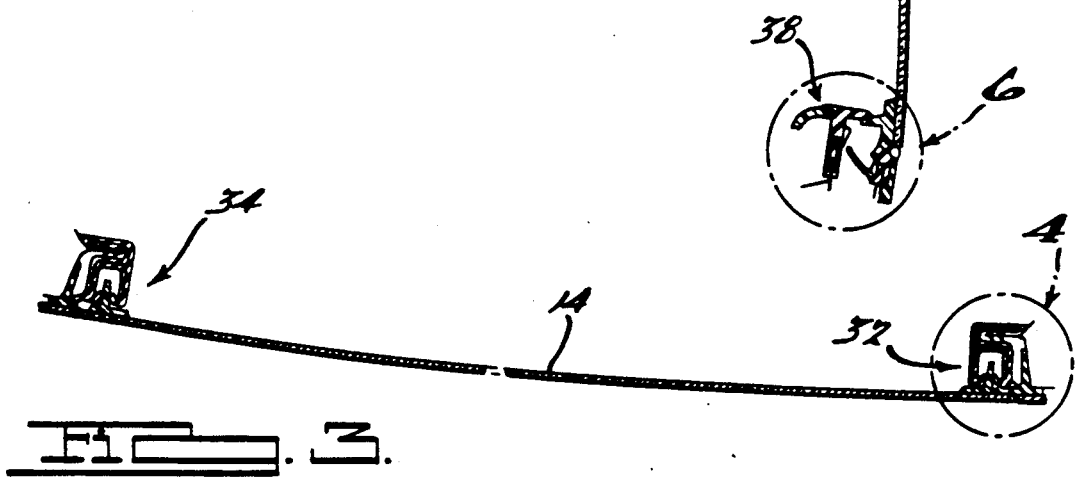
FIG. 3 is a horizontal cross-section view through a plane defined by line 3—3 of FIG. 1.

The member 50 is ordinarily elastomeric and adhesively secured or the like to the windows 14 and 15. The member 50 is generally T-shaped or L-shaped, having its vertical tail 60 received in the U-shaped channel 48 of the weather stripping 32, 34. second elastomeric T-shaped member 62 is adhesively secured to the side panel 18 or the mirror panel 19, as seen in FIGS. 3 and 4. The T-shaped member 62 includes a member 68 which forms a portion of the peripheral bead 20. The vertical tail 70 of the T-shaped member 62 abuts the vehicle opening and is contacted by the sealing flange 56 to provide further sealing of the windows 14 and 15 with the vehicle body.

Moving to FIG. 5, a cross-section view of the top header member 36 is shown. The top header member 36 includes a U-shaped channel 72. The U-shaped channel 72 includes a metallic U-shaped reinforcement member 74 surrounded by an integral elastomeric skin 76. Fingers 78 project from the skin 76 into the interior of the U-shaped channel 72 to secure the U-shaped channel 72 onto the flange 80. The leg 82 of the U-shaped channel 72 includes at its terminus, an angularly extending portion 84. The portion 84 includes a member 86 integrally formed with skin 76 which forms a portion of the peripheral bead 20.

A resilient and deflectable member 88 extends from the skin 76 at the junction of leg 82 and web 83. The member 88 moves from a first position where the member abuts the skin on leg 82 when the window is in a closed position, as seen in FIG. 5, to a second position when the window is rolled down, as seen in phantom in FIG. 5. In the second position, a channel 90 is formed between the leg 82 and the member 88. The channel 90 serves as a drip channel to remove precipitation, water or the like.

Turning to FIG. 6, a cross-section view of the bottom member 38 is illustrated. The bottom member 38 includes a retention member 92 having a metallic U-shaped reinforcement member 94. An integral skin 96 surrounds the U-shaped reinforcement member 94. The skin 96 includes a thickened or belly portion 98 on one of the legs 100 and the web 102 of the U-shaped reinforcement member 94. The belly portion 98 includes member 104 at its tip 106. The member 104 forms a portion of the peripheral bead 20.

A wiping member 108 extends from the belly portion 98 adjacent the free extending end of leg 100. The wiping member 108 cleans precipitation, water or the like from the windows when the windows move to a down and then up position within the doors 14 and 15. The wiping member 108 is deflectable and moves from an angled resting position with respect to the belly portion 98, as seen in FIG. 6, to a position substantially parallel to the door flange, as seen in phantom in FIG. 6, to enable the window 14 to be moved to a down position. The wiping member 108 reflexes to its original position to enable the flocking 110 on the wiping member 108 to contact the window 14 when the window moves to its up position.

The window 14 includes a member 112 adhesively secured to the interior of the bottom of window 14, as seen in FIG. 6. The member 112 has an overall "T" shape with a flange 114 extending from the horizontal portion of the "T". The T-shaped member 112 is rotated 90° when attached to the window so that the vertical tail 116 is in a horizontal plane. The flange 114 seals the member 112 with the belly portion 98 of the bottom member 38, as seen in FIG. 6. The tail 116 of the "T" member 112 seals the window 114 with a sealing member 118 on the interior of the door.

The sealing member 118 also has an overall "T" shape. One portion 119 of the horizontal member 120 of the "T" is in sealing contact with the tail member 116 of the member 112, as seen in FIG. 6. The vertical portion 122 of the T-shaped seal member 118 includes a metallic U-shaped reinforcement member 124. The reinforcement member 124 is surrounded by an integral skin 126 which forms the vertical 122 and horizontal 120 portions of the "T". The reinforcement member 124 surrounds a flange 128 to retain the seal member 118 onto the door panel, as seen in FIG. 6. The second portion 130 of the horizontal member of the "T" is in sealing contact with the interior trim panel 132 of the door 16.

The above-described system is generally used on a hard top type vehicle. The hard top vehicles enable the window members 50, and thus the windows 14 and 15, to be removed from the U-shaped receiving channels 48 of side members 32 and 34 when the doors 12 and 13 are opened. Thus, the windows 14 and 15 would extend freely from the doors 12 and 13 when the doors 12 and 13 are open.

A clip mechanism 134 is utilized to retain the windows 14 and 15 in a sealed position when the doors 12 and 13 are closed. Turning to FIGS. 7 and 8, a pin 136 is illustrated traversing the U-shaped channel 48 of the side member 32 near the junction of the side member 32 and top member 36. A cutout portion 138 is formed in the T-shaped member 50 at its upper end. The cutout portion 138 includes a tail 140 at the free extending end of the member 50. The tail 140 resiliently deflects to enable the tail 140 to be positioned behind the pin 136 when the window is in a closed position, as seen in FIG. 7. The tail 140 deflects, enabling the window 14 to be moved away from the pin 136 when the door is opened and deflects upon returning to its first position, as seen in phantom in FIG. 7. Also, as the vehicle travels, the pin 136 retains the tail 140 in position so that the window does not blow out or move away from a sealing contact with channel 48 during travel of the vehicle. Alternatively, tail 140 can be a rigid member which is adjusted into position by a camming up action during door closure.

Turning to FIGS. 9-15, other embodiments of the present invention are shown. Identical elements are designated with the same reference numerals.

In a vehicle where a free standing frame or the like is desired about the window 14 an embodiment like that of FIG. 9 may be utilized. When an integral frame is used, the bottom member 38 would remain the same as that previously discussed. The top member 36 will remain substantially the same, however, a frame, like that described below, will be included instead of a flange attachment. The side members are different. Turning to FIG. 9, a cross-section of a side member with an integral frame is shown.

The side members 142 include a metallic frame 144 surrounded by an integral elastomeric skin 146. The frame 144 may have varying types of configurations, generally including a U-shaped channel 148. The U-shaped channel 148 includes a pair of fingers 150 and 152 projecting from the skin 146 into the channel 148. The channel 148 also includes a guide way 154 adjacent to its web 156. The guide way 154 retains the window member 158 within the channel 148. A door bulb seal 160 is integrally formed with the skin 146 to enable the frame to be sealed against a door opening of the vehicle.

The window member 158 is of an "I" shape, having one of its horizontal portions 157 positioned in the guide way 154 to retain the window members 158 within channel 148. Thus, the window member 158 will not pull out of the U-shaped channel 148 and the window 14 remains in sealing contact with the gasket.

Another embodiment of a side member of the present invention is illustrated in FIGS. 10 and 11. The cross-sectional views illustrate a U-shaped channel similar to those previously described. The U-shaped channel 161 includes a reinforcement member 162 and an integral skin 164. A member for retaining the U-shaped channel 161 to a flange or an integral frame may be combined with the U-shaped channel 161. Also, a magnetic system like that disclosed in applicants' U.S. Pat. Application Ser. No. 272,484, entitled "Magnetic Window Seal Assembly", filed the same day as the present application, the specification of which is herein incorporated by reference, may be used to retain the channels onto the flange.

The channel 161 includes a pair of fingers 166 and 168 extending from the skin 164 into the channel 161. The fingers 166 and 168 have stops 170 and 172 at their terminus. The stops 170 and 172 are elongated and are positioned substantially parallel with the legs 174 and 176 of the U-shaped reinforcement member 162 when the window member 178 or 179 is retained in the U-shaped channel 161.

In the embodiment of FIG. 10, an I-shaped member 178 is adhesively secured to the window 14. One of the horizontal portions 180 of the "I" is retained behind the stops 170 and 172. Also, the fingers 166 and 168 and stops 170 and 172 would enable the "I" member to be removed from the channel if this type of system is utilized in a hard top system like that of FIG. 4. In the embodiment of FIG. 11, a T-shaped window member 179 is shown. Both embodiments may be utilized with either the hard top or integral frame systems.

Figure 12:
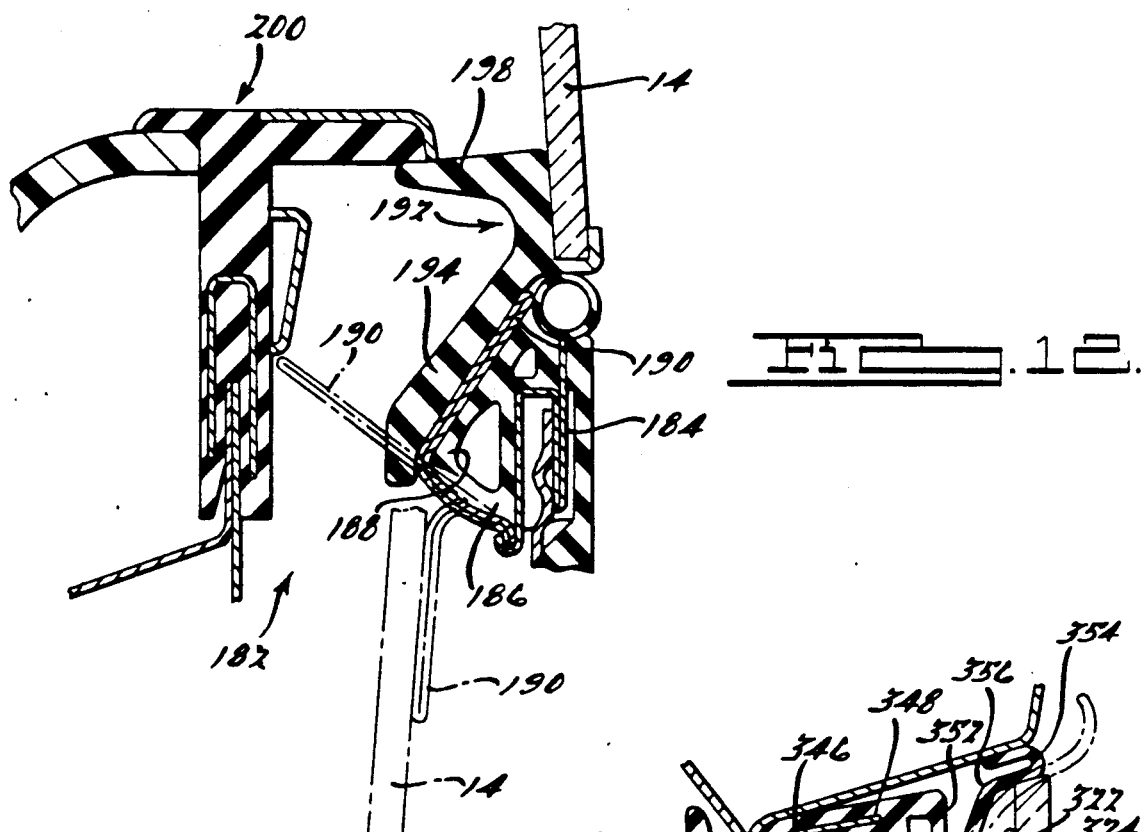
FIG. 12 is a vertical cross-section view of another embodiment of the present invention like that of FIG. 6.

FIG. 12 illustrates a cross-section view of another embodiment of a bottom member of the gasket assembly. The bottom member 182 includes a reinforcement member 184 surrounded by an integral elastomeric skin 186. The skin 186 includes an enlarged belly portion 188 projecting from one side of the reinforcement member 184. A wiping member 190 also projects from the same side as the belly portion 188. The wiping member 190 is formed from a flocked mylar material. The wiping member 190 moves from a first position when the window is closed to a second position when the window is open. In the first position, the wiping member 190 is positioned adjacent to the belly member 188 sandwiched between the member 192 and the belly member 188. As the window is opened, the wiping member 190 moves away from the belly member 188. As the window moves down into the door, the wiping member 190 deflects to a position substantially parallel with the outer sheet metal of the door. Once the window has reached its all the way down position within the door, the wiping member 190 moves to a position above the window, as seen in FIG. 12.

The member 192 has a first leg 194 which sandwiches the wiping member 190 against the belly member 188. Also, a channel 196 enables the window 14 to be secured onto the member 192. A second leg member 198 extends from the member 192 to contact with the T-shaped member 200. The T-shaped sealing member 200 functions substantially the same as T-shaped member 118 previously described herein.

Figure 13:
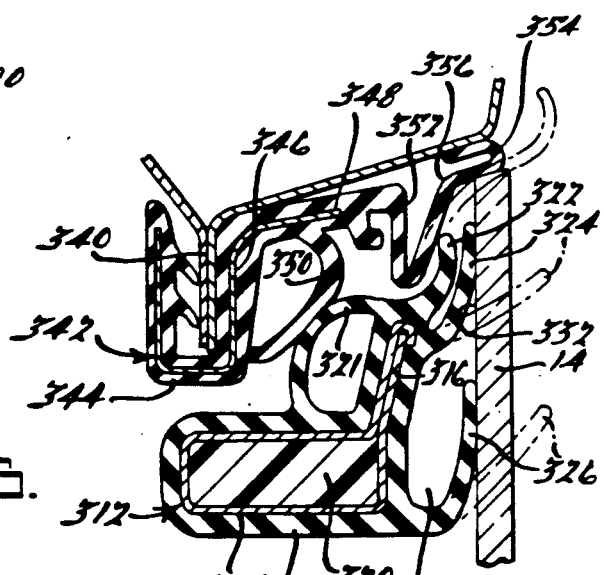
FIG. 13 is a vertical cross-section view of another embodiment of the present invention like that of FIG. 5.

FIG. 13 illustrates a cross-section view of another embodiment of a top member of the gasket assembly. The top member 210 includes a U-shaped reinforcement member 212 surrounded by integral elastomeric skin 214. The U-shaped reinforcement member 212 defines a channel 216 which secures the top member 210 to a flange 218. Fingers 220 extend from skin 214 into the channel 216 to enhance retention of the top member 210 onto flange 218. A member 222 extends from the skin 214 at the terminus of leg 224 of the U-shaped reinforcement member 212. The member 222 is resilient and deflectable and includes a hook 226 at its terminus. The hook 226 forms a portion of the bead 20. The member 222 moves from a first position where the member 222 abuts the roof when the window is closed, as seen in FIG. 13, to a second position where the window is open, as seen in phantom in FIG. 13. In the second position, a channel 230 is formed between the roof and the member 222. The channel 230 serves as a drip channel to remove precipitation, water or the like.

Figure 14:
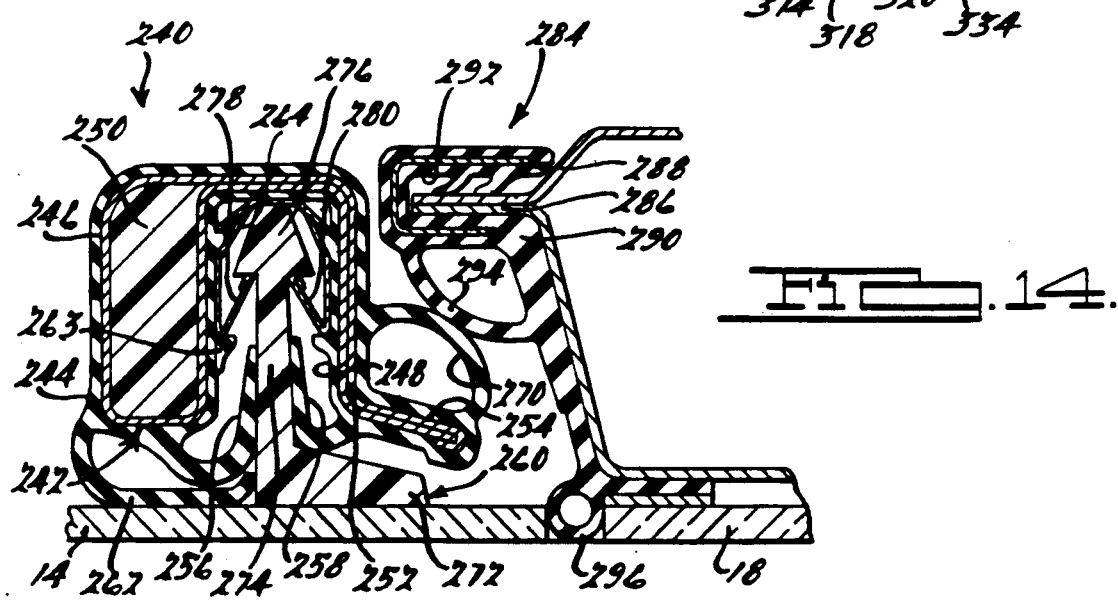
FIG. 14 is a horizontal cross-section view of another embodiment of the invention like that of FIG. 4.

Turning to FIG. 14, another cross-section view of a side member with an integral self-standing frame is shown. The side member 240 includes a metallic frame 242 surrounded by an integral elastomeric skin 244. The frame 242 includes a hollow rectangular portion 246 and a U-shaped channel 248. The hollow portion 246 may include a core 250 to provide stability. One of the legs 252 of the U-shaped channel 248 includes an extending portion 254. A pair of fingers 256 and 258 extend from the skin 244 into the channel 248 to seal the window member 260. A flange 262 also extends from the skin 244 to provide additional sealing. A plurality of nubs 263 extend from skin 244 within the channel 248. The nubs 263 retain a pin guide 264 within the channel 248. Also, a sealing bulb 270 extends from the skin 244 between leg 252 and extending portion 254.

The window member 260 is L-shaped having one of its legs 272 secured to the window 14. The other leg 274 including arrowhead 276 extends into channel 248. Arrowhead 276 is movably retained in the pin guide 264 by arms 278 and 280. The arrowhead 276 functions similar to the head 157 of the "I" of window member 158.

A seal member 284 may be secured to a flange 286 on the door opening. The seal member includes a U-shaped reinforcement member 288 with an integral elastomeric skin 290. The U-shaped reinforcement member 288 defines a channel 292 which is secured onto flange 286. A bulb 294 extends from the skin 290 and is in sealing contact with bulb 270. Also, a member 296 extends from the seal 284 to form a portion of the bead 20.

FIG. 15 illustrates a top or header member 310 which may be combined with the side member 240. The top member 310 includes a reinforcement member 312 having a hollow rectangular portion 314 and an arm 316 extending from one of the corners. The reinforcement member 312 is surrounded by an integral skin 318 and may include a core 320. A sealing bulb 321 extends from skin 318 between the rectangular portion 314 and arm 316. A plurality of fingers 322, 324 and 326 extend from the skin 318. Finger 322 extend substantially in line with arm 316 and is in sealing contact with member 330. Fingers 324 and 326 extend from skin 318 and ar deflectable from a first to a second position. In the first position, when the window 14 is in an up or closed position, the fingers 324 and 326 are adjacent finger 322 and arm 316, respectively. When the window 14 is opened, the fingers 324 and 326 deflect to a second position forming channels 332 and 334. The channels act as drip channels to enable removal of precipitation, water or the like.

Seal member 330 is secured to a flange 340 on the door opening. Seal member 330 includes a U-shaped reinforcement member 342 surrounded by an integral elastomeric skin 344. One of the legs 346 of the U-shaped reinforcement member 342 includes an angular extending portion 348. A sealing bulb 350 extends from skin 344 between leg 346 and extending portion 348 and is in sealing contact with bulb 321. Also, a V-shaped flange 352 extends from skin 34 at the terminus of the extending portion 348. The "V" provides a drip rail on seal member 330. Also, a hook portion 354 is formed at the terminus of the leg 356 of the "V" to provide a portion of the peripheral bead 20. A window system like that disclosed in applicant's co-pending Pat. Application Ser. No. 234,176, entitled "Modular Window Frame System for Automotive Vehicles", filed Aug. 19, 1988, the specification of which is herein incorporated by reference, may be modified to be utilized as the frame system of the present invention.

While the above detailed description sets forth preferred embodiments of the present invention, it will be apparent to those skilled in the art that the present invention is subject to modification, variation and alteration within the scope and spirit of the following claims.

What is claimed is:

1. A gasket system comprising:
   a gasket adapted too be secured about surfaces forming an opening, said gasket including means for retaining and sealing a window or the like, said gasket including one or more side weather strips, a top weather strip and a bottom weather strip, having a bead coupled therewith for providing a seal between the window perimeter and said surfaces forming the opening to prohibit contact of the window with the opening, said gasket being positioned about said opening such that when the window is positioned within the opening, the window substantially conceals said gasket and the window is flush at its perimeter with the opening with only the bead interposed therebetween for sealing between the opening and the window.

2. The gasket system according to claim 1 wherein the window is adapted to be movable in said gasket.

3. The gasket system according to claim 1 wherein said gasket further includes a reinforcement member surrounded by an elastomeric skin, said reinforcement member including means for securing said gasket to a flange on the opening.

4. The gasket system according to claim 1 wherein said gasket further includes a self-standing frame surrounded by an elastomeric skin.

5. A gasket system for an automotive vehicle comprising:
   an automotive vehicle having a member defining an opening for a window or the like, the window having an interior side surface and an exterior side surface; and
   a gasket comprising one or more side weather strips, a top weather strip, and a bottom weather strip such that said one or more side, top and bottom weather strips are associated with one another to position about a perimeter of the window, and are adapted to be secured about said opening, said gasket including means for retaining and sealing the window such that the exterior side surface of the window is substantially flush with the vehicle and the gasket is substantially concealed by the window; and
   a bead coupled with at least one of said one or more side, top and bottom weather strips for providing a seal between the perimeter of the window and the member defining the opening and providing spacing between the perimeter of the window and said member to prohibit contact of the window with said member forming said opening.

6. The gasket system according to claim 5 wherein the window is adapted to be movable in said gasket.

7. The gasket system according to claim 5 wherein said gasket further including a reinforcement member surrounded by an elastomeric skin, said reinforcement member including means for securing said gasket to a flange on the vehicle body.

8. The gasket system according to claim 5 wherein said gasket further including a self-standing frame surrounded by an elastomeric skin.

9. A bottom weather strip adapted for attachment to a lower portion of a window opening comprising:
   means adapted to retain the weather stripping onto a flange or the like in said lower opening; and
   means adapted to wipe an outer surface of a window or the like, said means adapted to wipe extending, from said means adapted too retain, in a first generally upwardly extending position adapted for interfering engagement with the window, such that when said window is moved to a second position the means adapted to wipe interferes with the window and flexes into a generally downwardly extending position for wiping the exterior of the window, said means adapted too wipe being substantially concealed from view when coupled on said flange.

10. The weather strip according to claim 9 wherein said means adapted to retain the weather stripping further comprises a reinforcement member having, in cross-section, a U-shaped channel and an elastomeric skin surrounding said reinforcement member.

11. The weather strip according to claim 10 wherein said skin includes a thickened portion.

12. The weather strip according to claim 10 wherein said means adapted too wipe is comprised of a member extending from said elastomeric skin.

13. The weather strip according to claim 12 wherein said member extending from said elastomeric skin further includes flocking for wiping of a window.

14. The weather strip according to claim 9 wherein said wiping means further comprises a mylar member surrounded by flocking extending from said weather strip.

15. The weather strip according to claim 9 further comprising:
   an elastomeric member fastened to a flange of a vehicle including a horizontal member and vertical member forming a "T" shape, said vertical member including means adapted for retaining said elastomeric member onto said flange or the like, said horizontal member adapted for sealing contact with a door panel and window member in a closed position.

16. The weather strip according to claim 15 wherein said vertical member retaining means includes a U-shaped reinforcement member surrounded by said elastomeric member adapted for securing to the flange or the like.

17. A weather strip comprising:
   means adapted to retain the weather strip to a flange or the like, said means comprising a reinforcement member, having in cross-section, a U-shaped channel and an elastomeric skin surrounding said reinforcement members;
   means adapted too remove precipitation or the like, said means adapted to remove precipitation extending from said retaining means such that said means adapted to remove precipitation is substantially concealed from view when coupled with a window in a closed position wherein said means adapted to remove precipitation comprises a resilient member extending from said skin, said member adapted to move from a first position wherein said member is adjacent to said U-shaped channel when the window is in a closed position to a second position extending from the U-shaped channel for forming a channel with said reinforcement member to remove precipitation or the like.

18. The weather strip according to claim 17 wherein said U-shaped channel further includes one or more fingers extending from said skin, said channel adapted to receive said flange and said fingers adapted to contact said flange to retain said weather strip on said flange.

19. The weather strip according to claim 17 further comprising means adapted for providing sealing and spacing of the perimeter of the window.

20. A weather strip comprising:
frame means adapted for positioning the weather strip about an opening;
means adapted to remove precipitation or the like, said precipitation removal means extending from said frame means such that said precipitation means is substantially concealed from view when coupled with a window in a closed position and said means adapted too remove precipitation moving away from said frame means forming a channel therewith when the window is in an open position; and
means, coupled with said window receiving channel, for prohibiting blow out of a window when the window is coupled with said weather strip.

* * * * *

UNITED STATES PATENT AND TRADEMARK OFFICE
CERTIFICATE OF CORRECTION

PATENT NO. : 5,054,242　　　　　　　　　　　　　　　Page 1 of 2
DATED : October 8, 1991
INVENTOR(S) : James F. Keys et al.

It is certified that error appears in the above-identified patent and that said Letters Patent is hereby corrected as shown below:

Column 1, line 62, after "of" insert --the--.

Column 2, line 4, after "the" insert --present--.

Column 2, line 60, before "second" insert --A--.

Column 6, line 47, "extend" should be --extends--.

Column 6, line 49, "ar" should be --are--.

Column 6, line 65, "skin 34" should be --skin 344--.

Column 7, line 15, claim 1, "too" should be --to--.

Column 8, line 12, claim 9, "too" should be --to--.

Column 8, line 19, claim 9, "too" should be --to--.

Column 8, line 30, claim 12, "too" should be --to--.

Column 8, line 60, claim 17, "too" should be --to--.

UNITED STATES PATENT AND TRADEMARK OFFICE
CERTIFICATE OF CORRECTION

PATENT NO. : 5,054,242
DATED : October 8, 1991
INVENTOR(S) : James F. Keys et al.

It is certified that error appears in the above-identified patent and that said Letters Patent is hereby corrected as shown below:

Column 10, line 9, claim 20, "too" should be --to--.

Signed and Sealed this

Twentieth Day of July, 1993

Attest:

MICHAEL K. KIRK

Attesting Officer     Acting Commissioner of Patents and Trademarks